United States Patent
Madrigal et al.

(10) Patent No.: US 11,648,864 B2
(45) Date of Patent: May 16, 2023

(54) MODULAR FOLDING SHELF FOR PERSONAL DEVICES

(71) Applicant: Safran Seats USA LLC, Gainesville, TX (US)

(72) Inventors: Jose Madrigal, Chihuahua (MX); Mario Herrera, Chihuahua (MX); Cristina Bermudez, Chihuahua (MX); Luis Eduardo Ornelas, Mexico City (MX)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/791,156

(22) PCT Filed: Jan. 8, 2020

(86) PCT No.: PCT/US2020/012731
§ 371 (c)(1),
(2) Date: Jul. 6, 2022

(87) PCT Pub. No.: WO2021/141577
PCT Pub. Date: Jul. 15, 2021

(65) Prior Publication Data
US 2023/0001835 A1 Jan. 5, 2023

(51) Int. Cl.
*B60N 3/00* (2006.01)

(52) U.S. Cl.
CPC .................. *B60N 3/004* (2013.01)

(58) Field of Classification Search
CPC .... B60N 3/004; B60N 3/005; B64D 11/0638; A47C 7/70; A47C 7/705

(Continued)

(56) References Cited

U.S. PATENT DOCUMENTS 2,770,513 A * 11/1956 Brown ..................... A47C 7/62
224/482
5,046,433 A * 9/1991 Kramer .................. B60N 3/004
297/188.06

(Continued)

FOREIGN PATENT DOCUMENTS

| CN | 104986081 A | 10/2015 |
| GB | 2029346 A | 3/1980 |

OTHER PUBLICATIONS

International Patent Application No. PCT/US2020/012731, International Search Report and Written Opinion, dated Jul. 27, 2020.

*Primary Examiner* — Jose V Chen
(74) *Attorney, Agent, or Firm* — Kilpatrick Townsend & Stockton LLP

(57) ABSTRACT

Described are modular folding shelves configured for removably connecting with a passenger seat back to support small items. The modular folding shelves can include an attachment portion configured to removably connect with a passenger seat back, a platform portion, and a folding support element connected between the attachment portion and the platform portion. The folding support element can be configured to fold between the attachment portion and platform portion when the platform portion is stowed, and to extend when the platform portion is deployed such that the folding support element supports the platform portion and prevents it from extending beyond the deployed configuration. The platform portion is pivotally connected with the attachment portion to allow the platform portion to fold upward and rest against or proximate to the passenger seat back when the modular shelf is installed and in a stowed configuration, and to extend away from the passenger seat back in a deployed configuration.

17 Claims, 8 Drawing Sheets

(58) Field of Classification Search
USPC .................................. 108/44; 297/163, 146
See application file for complete search history.

(56) References Cited

U.S. PATENT DOCUMENTS

| | | | | |
|---|---|---|---|---|
| 5,060,581 A * | 10/1991 | Malinski | ................ | B60N 3/005 |
| | | | | 248/441.1 |
| 5,413,035 A * | 5/1995 | Fernandez | ............ | B60N 3/005 |
| | | | | 100/44 |
| 5,443,018 A * | 8/1995 | Cromwell | .............. | B60N 3/004 |
| | | | | 108/44 |
| 5,487,521 A * | 1/1996 | Callahan | ................ | B60N 3/005 |
| | | | | 224/276 |
| 5,558,026 A * | 9/1996 | Seibert | ................... | B60N 3/005 |
| | | | | 224/276 |
| 5,845,585 A * | 12/1998 | Meeus | ................... | B60N 3/005 |
| | | | | 108/165 |
| 5,931,527 A * | 8/1999 | D'Onofrio | ............. | B60N 3/004 |
| | | | | 297/188.05 |
| 6,036,158 A * | 3/2000 | Raasch | ................... | B60N 3/005 |
| | | | | 248/441.1 |
| 6,457,421 B1 * | 10/2002 | Apichom | ............... | B60N 3/005 |
| | | | | 108/44 |
| 7,216,789 B2 * | 5/2007 | Caradimos | .......... | B60R 11/0252 |
| | | | | 224/276 |
| 7,481,169 B2 * | 1/2009 | Larson | ................... | B60N 3/002 |
| | | | | 248/346.05 |
| 8,881,659 B2 * | 11/2014 | Ackeret | ................. | B60N 3/004 |
| | | | | 297/188.2 |
| 2006/0032410 A1 * | 2/2006 | Miller | ................... | B60N 3/005 |
| | | | | 108/44 |
| 2006/0289576 A1 * | 12/2006 | Krusell | ................. | B60N 3/005 |
| | | | | 224/276 |
| 2007/0283855 A1 * | 12/2007 | Pozzi | ................... | A47B 23/043 |
| | | | | 108/44 |
| 2008/0041280 A1 * | 2/2008 | Rubenstein | ............ | B60N 3/005 |
| | | | | 108/44 |
| 2008/0257228 A1 * | 10/2008 | Chisler | ................. | B60N 3/005 |
| | | | | 108/44 |
| 2010/0275818 A1 * | 11/2010 | Ellis | ....................... | A47B 23/04 |
| | | | | 108/147.11 |

\* cited by examiner

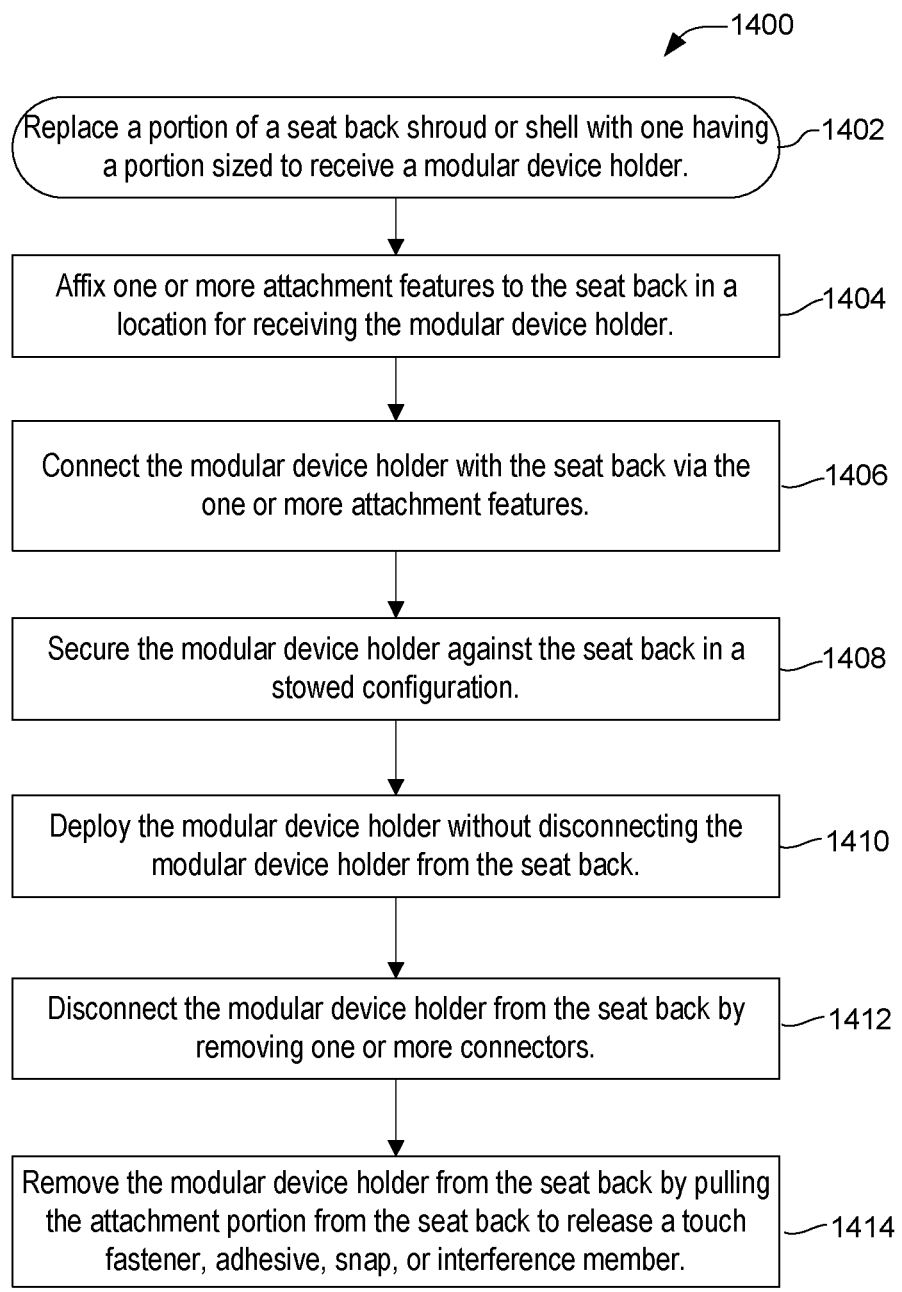

MODULAR FOLDING SHELF FOR PERSONAL DEVICES

FIELD OF THE INVENTION

The field of the invention relates to trays and utilities for passenger seats.

BACKGROUND

Passenger seating arrangements for a wide variety of conveyances are designed to provide for passengers' comfort, convenience, and entertainment, while meeting various safety and utilitarian requirements. Common utilities for passenger compartments include, for example, tray tables, cup holders, seat back pockets, and the like, which are designed for such purposes as holding food, supporting a laptop computer, or providing a convenient place to stash a book or magazine.

With the advent of smart devices receiving high-speed internet, by cellular network or by local internet networks, it is in some ways easier than ever to meet the entertainment needs of passengers. However, many of the existing utility solutions for the passenger compartment are poorly suited to supporting portable electronic devices. Moreover, existing passenger needs for information, entertainment, and storage have not changed. Therefore, novel utility solutions for the passenger compartment are still needed to accommodate increasing electronics use.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a modular folding shelf for supporting passenger personal devices can include an attachment portion configured to removably connect with a passenger seat back, and a platform portion connected with the attachment portion by a hinge. The platform portion can fold upward toward the attachment portion (and thereby toward the passenger seat back) and rest proximate to the passenger seat back when the modular folding shelf is installed and in a stowed configuration, and can extend away from the passenger seat back in a deployed configuration. A folding support element can be connected between the attachment portion and the platform portion that folds between the attachment portion and the platform portion when the platform portion is stowed, and extends when the platform portion is deployed. The folding support element prevents the platform portion from extending beyond the deployed configuration, and can support the platform portion when the modular folding shelf is supporting the weight of a passenger item or personal device. The platform portion is positioned with respect to the passenger seat back so that, when in the deployed position, the platform portion can support a passenger's personal device while it rests at an angle against the passenger seat back or a component attached thereto, preferably at a suitable viewing angle for a seated passenger.

According to certain embodiments of the present invention, a passenger seat can include a seat back configured to support a passenger and a modular folding shelf removably connected with the seat back. The modular folding shelf can include an attachment portion removably connected with the seat back and a platform portion connected with the attachment portion by a hinge. The hinge allows the platform portion to fold upward toward the attachment portion (and thereby toward the passenger seat back) when the folding shelf is stowed, and to extend away from the seat back when the folding shelf is deployed. A folding support element connects between the attachment portion and the platform portion and folds between the attachment portion and the platform portion when the platform portion is stowed, and extends when the platform portion is deployed such that the folding support element supports the platform portion.

According to certain embodiments of the present invention, a method of installing a modular folding shelf to a passenger seat can include, with a modular folding shelf according to any of the embodiments disclosed herein, attaching the modular folding shelf to a seat back of a passenger seat positioned such that, when the folding shelf is deployed, the platform portion and the seat back are arranged to support a personal electronic device. Attaching the modular folding shelf can include removably connecting the attachment portion to the seat back by one of a touch fastener, adhesive, snap, or mechanical connector, and may further include inserting an extension of the modular folding shelf into the seat back so that the extension supports the modular folding shelf.

BRIEF DESCRIPTION OF THE DRAWINGS

FIG. 14 is a process flow chart illustrating a method of retrofitting a passenger seat to receive a modular folding shelf as illustrated in any of FIGS. 1-13B.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide for modular folding shelves for passenger seats that are capable of rapid installation or replacement and suitable for holding one or more small items in conjunction with a passenger seat placed forward of a seated passenger. While the modular folding shelves are discussed for use with aircraft seats, they are by no means so limited. Rather, embodiments of the modular folding shelves may be used in passenger seats or other seats of any type or otherwise as desired.

Figure 1:
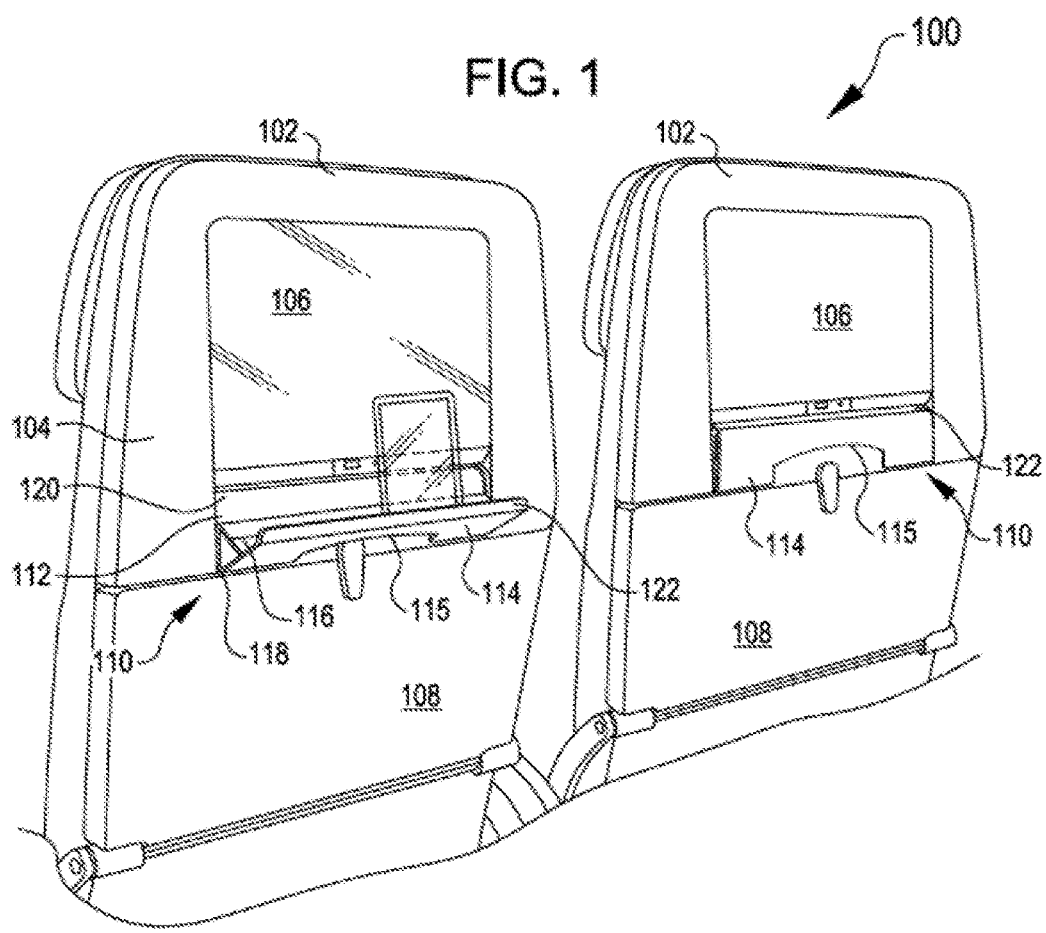
FIG. 1 is a perspective view of a passenger seating arrangement, illustrating the placement of a modular folding shelf, according to certain embodiments of the present invention.

According to certain embodiments of the present invention, as shown in FIG. 1, a passenger seat assembly 100 can include one or more passenger seats 102 and modular folding shelves 110 mounted thereto. Structural portions of the passenger seats 102 and modular folding shelves 110 may be formed of materials including but not limited to aluminum, stainless steel, aramid fibers, polycarbonate, polypropylene, other metallic materials, composite materials, or other similar materials. A passenger seat 102 includes a passenger seat back 104 that can include a wide variety of features, with typical passengers seats including a media device 106 and a tray table 108. Configurations of passenger seats 102 can include pockets, cup holders, privacy screens, or many other elements. The modular folding shelf 110 can be mounted to the passenger seat back 104 at any suitable aft-facing portion thereof, e.g., between a provided media device 106 and tray table 108 as shown, or at any other suitable location.

A modular folding shelf 110 can include an attachment portion 112 and a platform portion 114 that are connected by a folding support element 116. The attachment portion 112 is configured to be attached to the seat back 104, and the platform portion 114 is then operable to unfold away from the attachment portion, to be supported by the folding support element 116 and thereby provide a small shelf or platform capable of supporting lightweight passenger articles. In some embodiments, the attachment portion 112 and platform portion 114 are reduced by a cutout 115 that can reduce the overall footprint of the modular folding shelf 110 when it is attached to the seat back 104 (e.g., to allow clearance for other devices attached to the passenger seat 102), the cutout 115 being concealed by the folding support element 116 when the modular folding shelf 110 is deployed. The platform portion 114 unfolds via a hinge 118 positioned at a lower extent or bottom end of the attachment portion 112. The platform portion 114 may include a flanged end 122 formed by a flanged or tilted end of the platform portion, which is positioned to help to retain items placed on a deployed modular folding shelf 110.

In some embodiments, the attachment portion 112 may include an additional retainer 120 formed of a flanged or hooked end of the attachment portion that can hook over a structural part of the seat back 104 in order to support the weight of the modular folding shelf 110 when the modular folding shelf is installed to a seat back. The attachment portion 112 is connected with the passenger seat back 104 with sufficient strength that, when the modular folding shelf 110 is deployed, the platform portion 114 can support at least the weight of most flat consumer electronics, including but not limited to: cellular phones, portable game consoles, tablet computing devices, and laptop computers that convert to a tablet mode. In some embodiments, the weight capacity of the modular folding shelf is at least 0.8 kg, preferably at least 1 kg, preferably at least 2 kg, and more preferably at least 2.5 kg.

Figure 2:
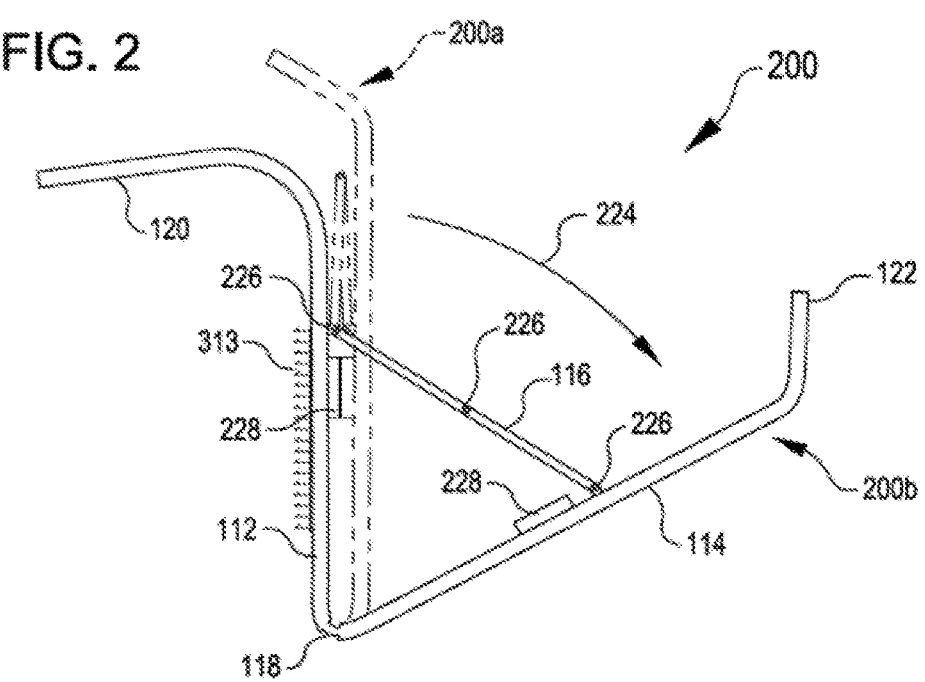
FIG. 2 is a side schematic view illustrating a first example of a modular folding shelf according to FIG. 1.

Additional detail concerning the attachment and operation of the modular folding shelf 110 is presented below with reference to FIGS. 2-13B. For example, FIG. 2 is a side schematic view illustrating a first example of a modular folding shelf 200, which is configured to connect with a passenger seat as shown with reference to modular folding shelf 110 according to FIG. 1. The modular folding shelf 200 includes attachment portion 112 and platform portion 114, with respective curved extensions forming the retainer 120 and flanged end 122. Hinge 118 can be formed by a narrowing of the material forming the modular folding shelf 200 as a whole, which may include a thermoformed polymer, textile or polymer composite, leather or treated leather product, or the like. Such hinges can be referred to as a living hinge, or live hinge. In some embodiments, hinge 118 can be formed by a change in material, e.g., from a rigid or semi-rigid material or assembly in the attachment portion 112 and platform portion 114, to a softer or more flexible material at the hinge 118.

The platform portion 114 can unfold from a stowed configuration 200a to a deployed configuration 200b about the hinge 118. An angle 224 between the stowed configuration 200a and deployed configuration 200b can be less than 90 degrees, between 45 and 90 degrees, or approximately 60 degrees. According to some embodiments, the angle 224 can be up to 60 degrees to allow the shelf to correctly hold a personal electronic device when the seat back 104 reclines. The angle 224 is limited by the support element 116, which unfolds in an accordion-like manner at multiple hinges 226 to support the platform portion 114 in the deployed configuration 200b. A resulting inclination of the platform portion 114 depends on the angle of the passenger seat back 104, but may be at least 10 degrees, preferably at least 20 degrees, to ensure that the platform portion remains inclined toward the passenger seat back when deployed and when the passenger seat back is reclined, with some buffer to account for changes in the inclination of the passenger cabin. According to some embodiments, the hinges 226 of the support element 116 can be attached to the attachment portion 112 and platform portion 114, and can rotate about pins like conventional hinges; but in some embodiments, the support element 116 can also be fabricated directly from the same material as a remainder of the modular folding shelf 200, and the support element hinges 226 can be formed as live hinges.

The body of the modular folding shelf 200 (i.e., the attachment portion 112 and retainer 120, and the platform portion 114 and flanged end 122) can be formed as a single part by any suitable thermoforming technique, e.g., molding, extrusion, or the like. In some embodiments, the attachment portion 112, platform portion, and support element 116 can be formed together as a single part by a thermoforming process. Live hinges in the modular folding shelf 110, e.g., hinge 118 or support hinges 226, can be formed by direct manufacture of the live hinges during a forming process, or may be formed by scoring or cutting the body of the modular folding shelf after an initial forming process.

Various attachment means can be used to mount the attachment portion 112 to a passenger seat back (e.g. seat back 104). For example, according to some embodiments, a touch fastener 313 can be fixed to the attachment portion 112 in a forward-facing direction and configured to mate with a matching surface or touch fastener on a passenger seat back. The touch fastener 313 can be a hook-and-loop type fastener, with either the felted or the hook portion fixed to the modular folding shelf 200, and the mating element fixed to the seat back to which the modular folding shelf will be installed. Other suitable touch fasteners can be used, adhesives or adhesive tapes, snap-fit mechanisms, magnets, or comparable attachment mechanisms.

The modular folding shelf 200 can include one or more retention elements 228 that are connected at least with the platform portion 114 and configured to retain the modular folding shelf in the stowed configuration 200a, in order to keep the modular folding shelf secured when not in use. According to some embodiments, and as shown in FIG. 2, the retention elements 228 can be magnets positioned on the platform portion 114 and attachment portion 112 and positioned so that the magnets interact with each other to retain the platform portion 114 in the stowed configuration 200a. The retention elements 228 as shown are positioned underneath the support element 116 so that they are not visible to a passenger using the modular folding shelf 200; however, retention elements may be placed above or on the support element instead if desired, or at any suitable location where folding portions of the modular folding shelf approach each other in the stowed configuration 200a. Various alternative retention elements 228 may be used, such as snaps, hooks, touch fasteners, removable adhesives, or other releasable retainers.

Additional examples of modular folding shelves are illustrated in FIGS. 3-13, as described below. Unless explicitly contraindicated, the specific elements of each example modular folding shelf may be substituted in each other example in any suitable combination.

Figure 3:
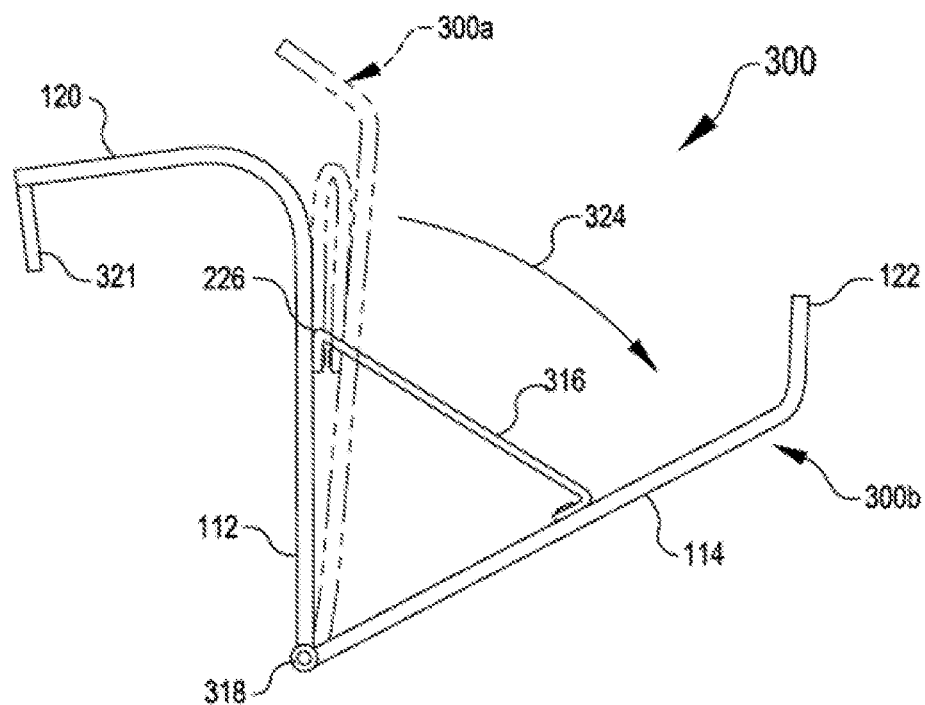
FIG. 3 is a side schematic view illustrating a second example of a modular folding shelf according to FIG. 1.

FIG. 3 is a side schematic view illustrating a second example of a modular folding shelf 300 that is attachable with a passenger seat similar to modular folding shelf 110 according to FIG. 1. The modular folding shelf 300 includes attachment portion 112 and platform portion 114, with respective curved extensions forming the retainer 120 and flanged end 122. Modular folding shelf 300 can differ from modular folding shelf 110 in that the hinge 318 may be formed by connecting separate attachment portion 112 and platform portion 114 at a pin about which the platform portion can rotate.

A support element 316 can be connected with both the attachment portion 112 and the platform portion 114 to limit the range of movement of the platform portion when it is deployed from a stowed configuration 300a to a deployed configuration 300b. The support element 316 can be formed of any suitable flexible material that readily folds and unfolds when the platform portion 114 is stowed or deployed, respectively. According to some embodiments, the support element 316 can be a textile or flexible leather band that runs a length of the modular folding shelf 300 and is fixed to the attachment portion 112 and platform portion 114. According to various other embodiments, the support element 316 can be a flexible polymer that includes one or more live hinges that allow the support element to bend. The angle 224 between the attachment portion 112 and platform portion 114 is limited by the support element 316, and may vary depending on the dimensions of the support element and its placement along the attachment portion and platform portion. In some embodiments, the angle 324 can be than 90 degrees, between 45 and 90 degrees, or approximately 60 degrees. According to some embodiments, the angle 224 when the platform portion 114 is deployed can be up to 60 degrees to allow the modular folding shelf 300 to correctly hold a passenger's personal electronic device when the seat back 104 reclines. Similar angles between the attachment portion 112 and platform portion 114 may be present among other embodiments of modular folding shelves disclosed herein.

As an alternative to touch fasteners (e.g., touch fastener 313, FIG. 3), or in addition to such fasteners, the modular folding shelf 300 may be connected with a passenger seat back by way of a flanged extension 321 from the attachment portion 112 that secures the modular folding shelf to the passenger seat such that removal of the modular folding shelf requires lifting the assembly. The flanged extension 321 can be used in conjunction with any other suitable attachment means to increase the weight-bearing capacity of the modular folding shelf.

Figure 4:
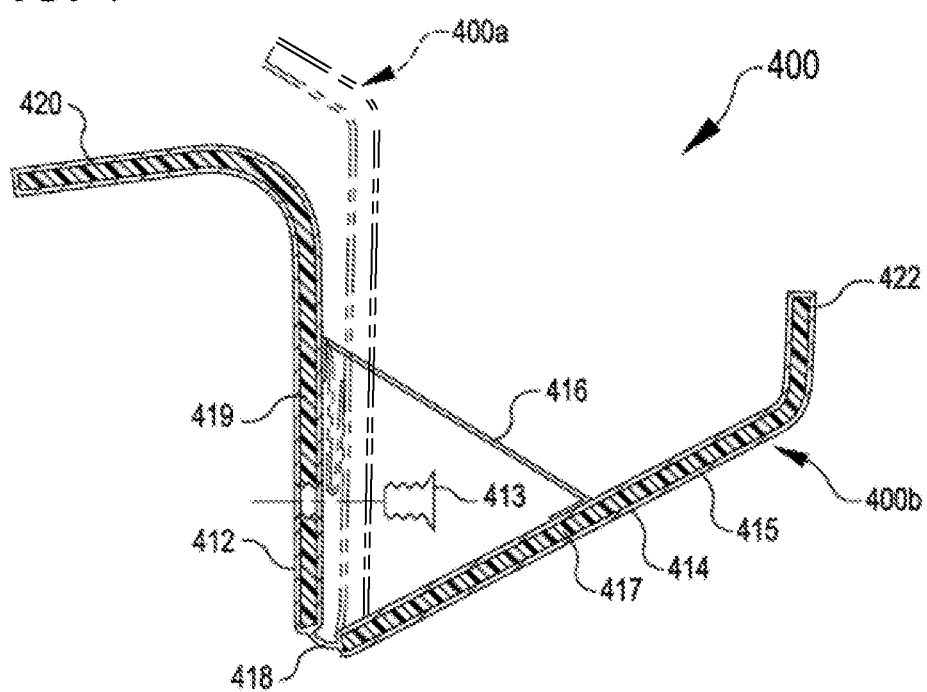
FIG. 4 is a side schematic view illustrating a third example of a modular folding shelf according to FIG. 1.

FIG. 4 is a side schematic view illustrating a third example of a modular folding shelf 400 that is attachable with a passenger seat similar to modular folding shelf 110 according to FIG. 1. The modular folding shelf 400 includes attachment portion 412 and platform portion 414, with respective curved extensions forming the retainer 420 and flanged end 422. Modular folding shelf 400 can differ from modular folding shelves 110 or 200 (above) in that the attachment portion 412 and platform portion 414 can each be formed of rigid or semi-rigid substrates 419 and 417, respectively, and covered by a flexible covering 415 or sheathe, which may be a flexible polymer, textile, leather, or similar construction. The covering 415 can also form a hinge 418 that allows the modular folding shelf 400 to bend, and for the platform portion 414 to fold outward from the stowed configuration 400a to the deployed configuration 400b.

A support element 416 can be connected with both the attachment portion 412 and the platform portion 414 to limit the range of movement of the platform portion when it is deployed from the stowed configuration 400a to the deployed configuration 400b. The support element 416 can be formed of any suitable flexible material that readily folds and unfolds when the platform portion 414 is stowed or deployed, as described above with reference to other support elements described herein (e.g. 116, 316, or 516). According to some embodiments, the support element 416 can be a textile, leather, or flexible polymer band that runs a length of the modular folding shelf 400 and is fixed to the attachment portion 412 and platform portion 414. According to various other embodiments, the support element 416 can be an extension of, or can be attached to, the flexible covering 415.

The attachment portion 412 of the modular folding shelf 400 can be connected with a seat back of a passenger seat by way of a connector 413, such as a pin, screw, bolt, rivet, or other suitable connector that can attach the modular folding shelf to a surface of a seat back. The connector 413 is preferably removable to allow for nondestructive removal, replacement, or reattachment of the modular folding shelf 400. Similar connectors to connector 413, as indicated above, may be used as a supplement to or as an alternative attachment means for any of the embodiments of modular folding shelves described herein.

Figure 5:
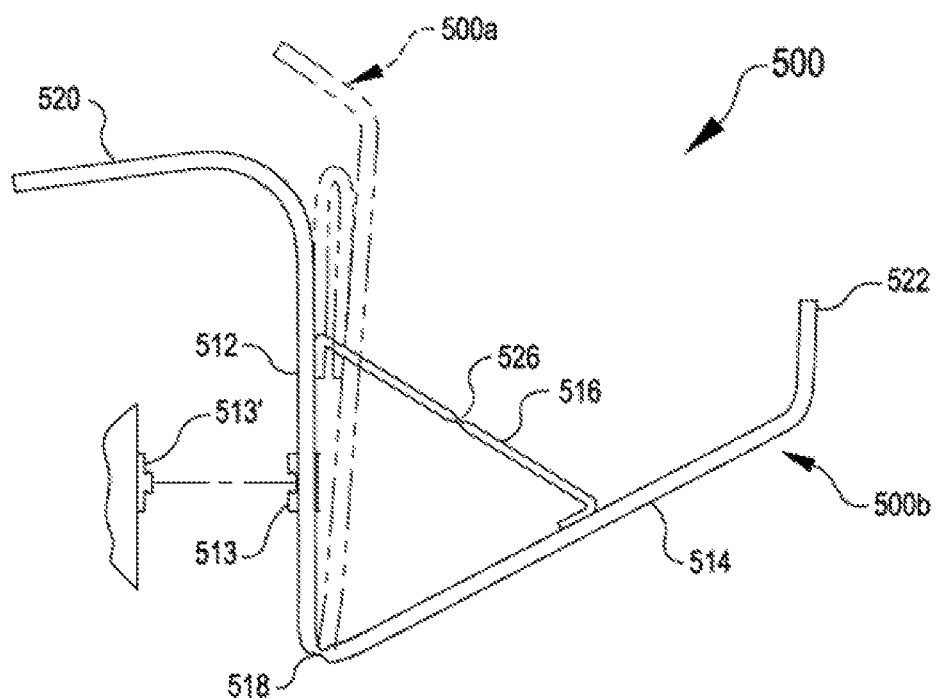
FIG. 5 is a side schematic view illustrating a fourth example of a modular folding shelf according to FIG. 1.

FIG. 5 is a side schematic view illustrating a fourth example of a modular folding shelf 500 that is attachable with a passenger seat similar to modular folding shelf 110 according to FIG. 1. The modular folding shelf 500 includes attachment portion 512 and platform portion 514, with respective curved extensions forming the retainer 520 and flanged end 522. Modular folding shelf 500 can differ from modular folding shelves described above in that the attachment portion 512 and platform portion 514 can each be formed of semi-rigid polymer, textile, textile composite, leather, or polymer composite that demonstrates rigidity above a predetermined thickness, and behaves flexibly below that thickness. The material forming the attachment portion 512 and platform portion 514 is thinned (e.g., by molding or by material removal) to form a live hinge 518. A support element 516 can be connected with both the attachment portion 512 and the platform portion 514 to limit the range of movement of the platform portion when it is deployed from the stowed configuration 500a to the deployed configuration 500b. The support element 516 can be formed of a similar or identical material as the attachment portion 512 and platform portion 514, that readily folds and unfolds along live hinges 526 when the platform portion is stowed or deployed. According to some embodiments, the support element 516 can be a textile, leather, or flexible polymer band that runs a length of the modular folding shelf 500 and is fixed to the attachment portion 512 and platform portion 514. According to some further embodiments, the support element 516 can be co-formed (e.g., integrally molded or extruded together) with the attachment portion 512 and platform portion 514.

The attachment portion 512 of the modular folding shelf 500 can be connected with a seat back of a passenger seat by way of a snap-fit connector 513, configured to mate with a matching snap-fit connector 513' fixed to a surface of a seat back. Similar connectors to connector 513, as indicated above, may be used as a supplement to or as an alternative attachment means for any of the embodiments of modular folding shelves described herein.

Figure 6:
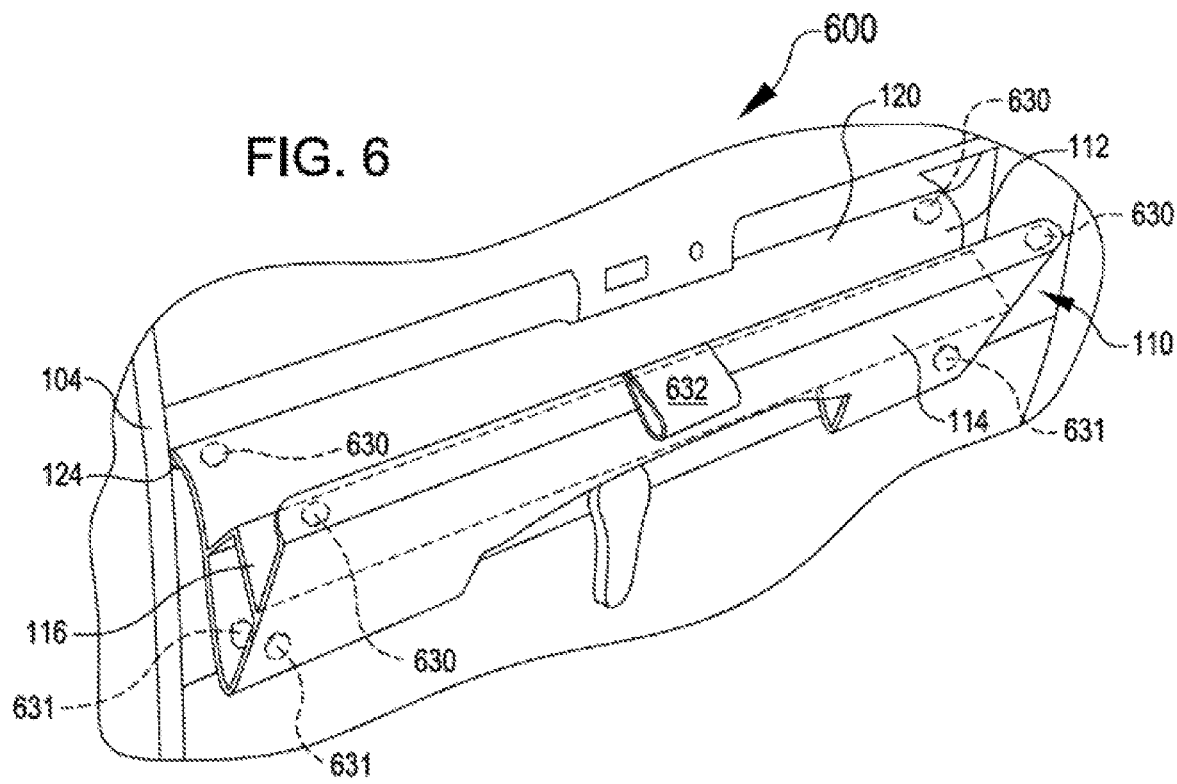
FIG. 6 is a perspective view of a passenger seating arrangement and attached modular folding shelf, showing a first example of a magnetic closure mechanism.

A variety of specific closure means are described below with reference to FIGS. 6-13B, each of which can be used interchangeable with a suitable modular folding shelf (FIGS. 1-5) configured for attachment with a passenger seat. For example, FIG. 6 is a perspective view of a passenger seating arrangement having a passenger seat back 104 and an attached modular folding shelf 110, showing a first example of a magnetic closure mechanism 600 in which matching pairs of magnetic elements 630 are connected with the platform portion 114 and with the attachment portion 112 of the modular folding shelf. Magnetic elements 630 are shown positioned along an upper extent of the modular folding shelf 110, however, alternative or additional magnetic elements 631 can be positioned at a lower extent of the modular folding shelf where they are concealed by the support element 116. The magnetic elements 630, 631 may be attached to or embedded within the body of the modular folding shelf 110. According to some embodiments, a pull tab 632 or loop can be provided as a handle for use by a passenger, or to indicate the appropriate location from which to deploy or stow the modular folding shelf.

Figure 7:
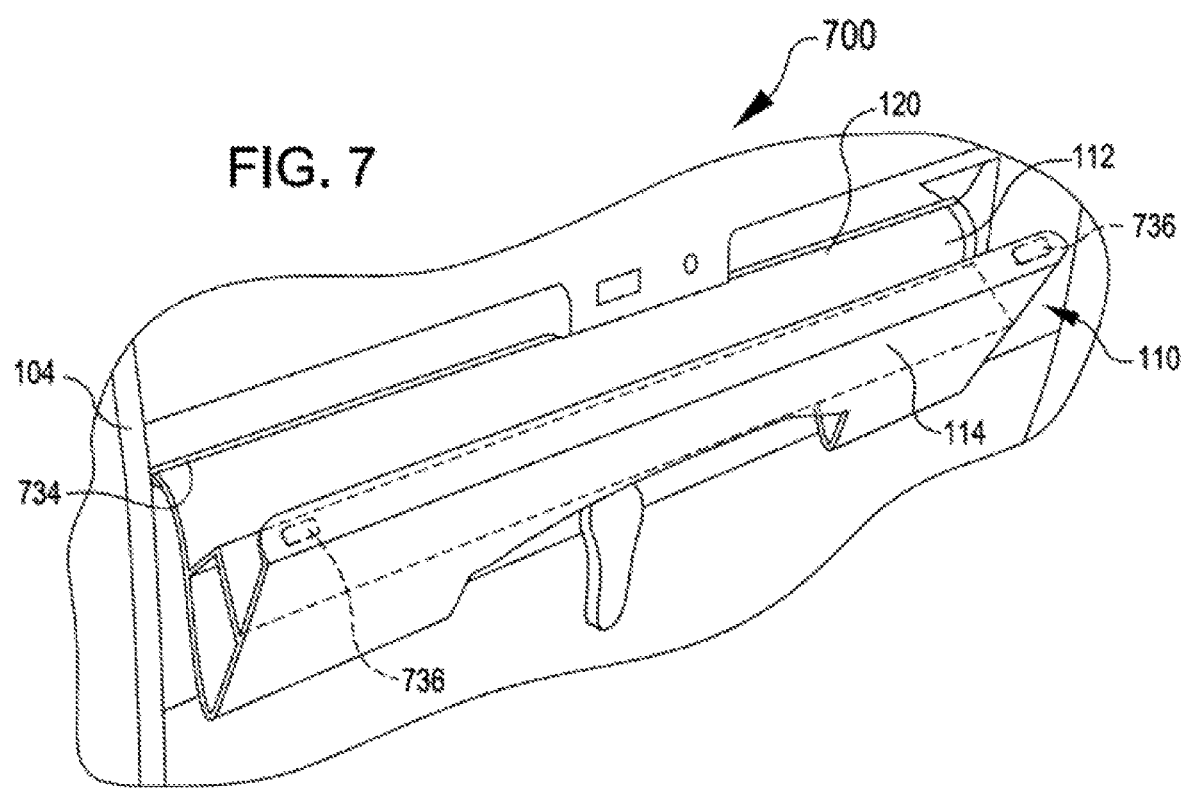
FIG. 7 is a perspective view of a passenger seating arrangement and attached modular folding shelf, showing an example of an interference closure mechanism.

FIG. 7 is a perspective view of a passenger seating arrangement having a passenger seat back 104 and an attached modular folding shelf 110, showing an example of an interference closure mechanism 700. One or more small protrusions 736 are attached with the platform portion 114 of the modular folding shelf 110, and positioned in such a way that they interact with a restraint 734 attached either to the seat back 104 or to the attachment portion 112 of the modular folding shelf. The protrusions 736 may be integrally formed with the platform portion 114, or may be separate components that are attached thereto. The protrusions 736 and restraint 734 can be positioned so that the restraint prevents deployment of the modular folding shelf 110 under its own weight, but allows deployment in response to a force exerted by a passenger, which can include either sufficient force to cause elastic deformation of either the restraint 734 or protrusions 736, or sufficient downward force on the platform portion 114 sufficient to cause generalized bending of either the attachment portion 112 or platform portion 114 such that the protrusions clear the restraint.

Figure 8:
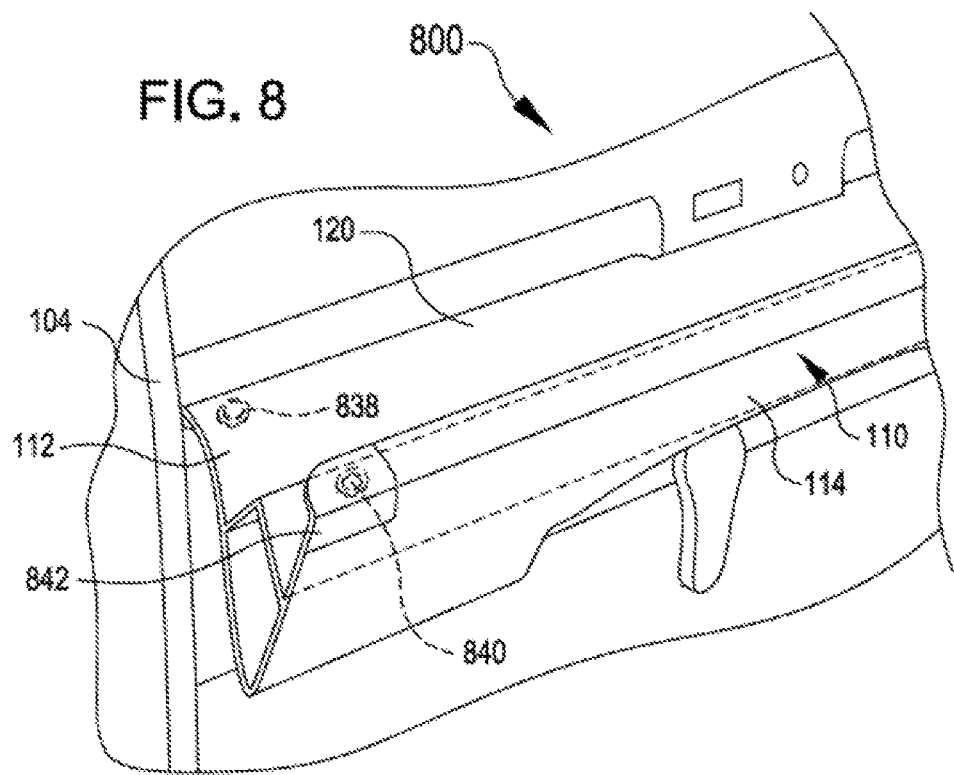
FIG. 8 is a perspective view of a passenger seating arrangement and attached modular folding shelf, showing an example of a snap closure mechanism.

FIG. 8 is a perspective view of a passenger seating arrangement having a passenger seat back 104 and an attached modular folding shelf 110, showing an example of a snap closure mechanism 800. In some embodiments, a snap stud 838 is connected with either the attachment portion 112 or the seat back 104, and positioned to mate with a snap socket 840 that is connected with the platform portion 114 of the modular folding shelf 110. In some embodiments, a concealing panel or flap 842 may be installed covering the snap socket 840, and may include coloring, symbols, or written indicia to communicate instructions to deploy or stow the modular folding shelf 110 using the snap. The snap socket 840 and snap stud 838 may also be reversed.

Figure 9:
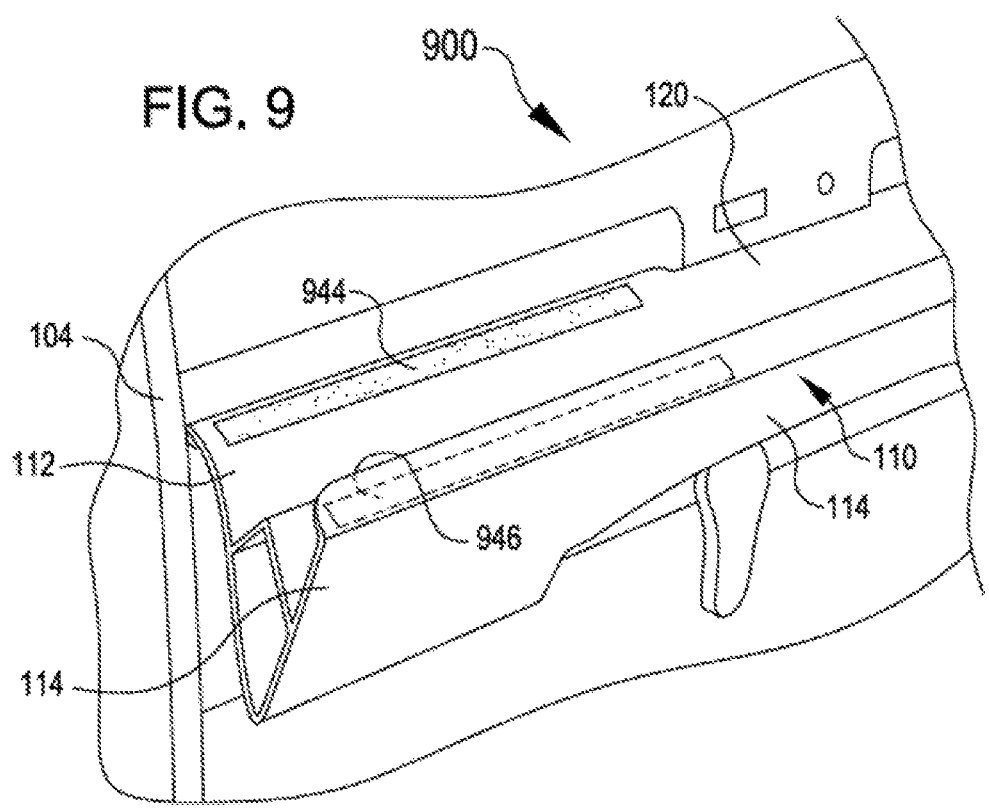
FIG. 9 is a perspective view of a passenger seating arrangement and attached modular folding shelf, showing a first example of a touch-fastener closure mechanism.

FIG. 9 is a perspective view of a passenger seating arrangement having a passenger seat back 104 and an attached modular folding shelf 110, showing a first example of a touch-fastener closure mechanism 900. In some embodiments, mating touch-fastener surfaces may be positioned within the modular folding shelf 110 along the attachment portion 112 and platform portion 114. For example, a hook-type element 946 may be attached to the platform portion 114, to mate with a loop-type element 944 attached to the attachment portion. The type of touch-fastener element may vary, and is not generally required to provide a strong holding force. A wide variety of touch fasteners may be used, such as but not limited to: removable adhesive pads or tape, hook and hook, post and post, or comparable alternatives.

Figure 10:
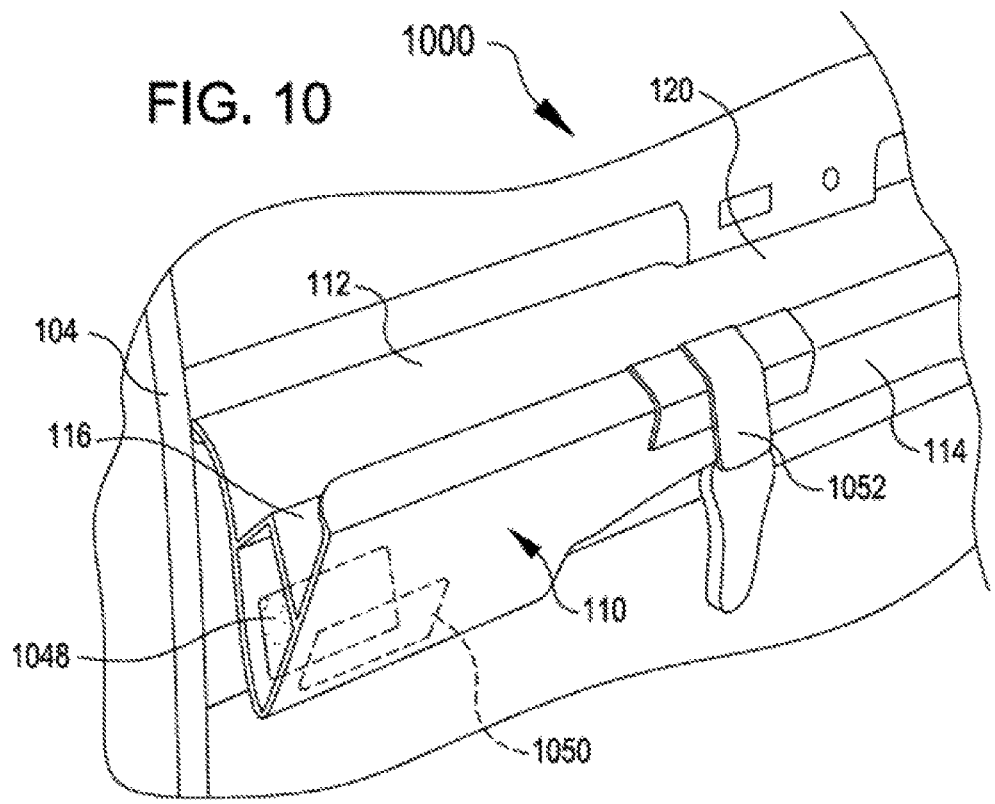
FIG. 10 is a perspective view of a passenger seating arrangement and attached modular folding shelf, showing a second example of a touch-fastener closure mechanism.

FIG. 10 is a perspective view of a passenger seating arrangement having a passenger seat back 104 and an attached modular folding shelf 110, showing a second example of a touch-fastener closure mechanism 1000. Touch-fastener closure mechanism 1000 includes a first touch fastening element 1048 attached with the attachment portion 112 of the modular folding shelf, and a second touch fastening element 1050 attached with the platform portion 114 of the modular folding shelf, where both fastening elements are located below the support element 116 thus concealing both fastening elements. Embodiments of modular folding shelves lacking visible closure mechanisms can include additional elements such as a tab 1052, strap, or other control feature accessible to a passenger and suitable for indicating where and how to deploy the modular folding shelf 110.

Figure 11:
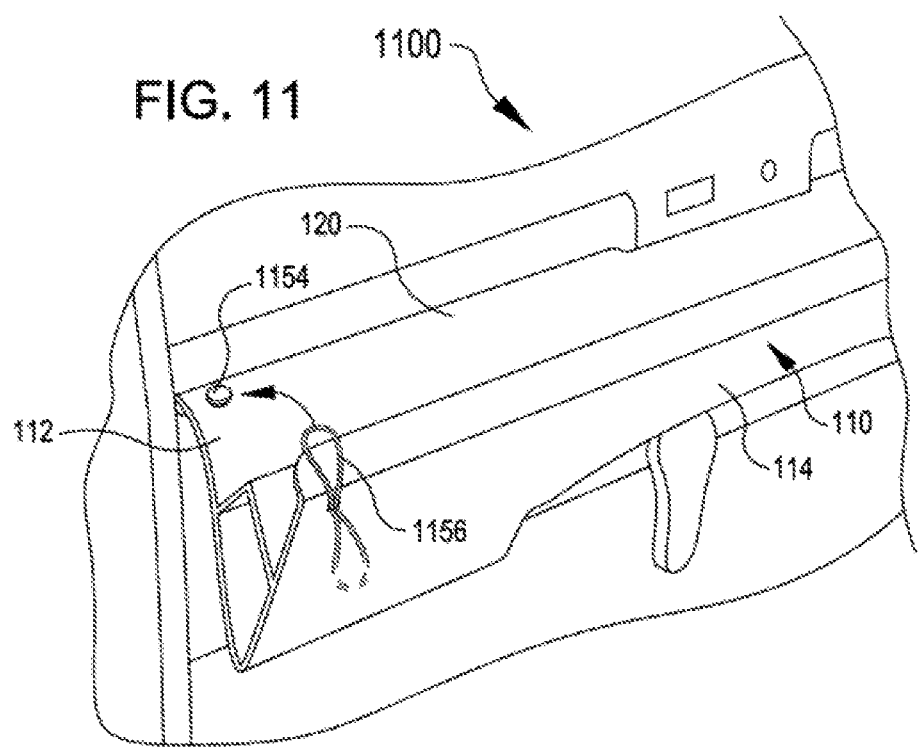
FIG. 11 is a perspective view of a passenger seating arrangement and attached modular folding shelf, showing an example of a loop/button closure mechanism.

FIG. 11 is a perspective view of a passenger seating arrangement having a passenger seat back 104 and an attached modular folding shelf 110, showing an example of a loop/button closure mechanism 1100. The loop/button closure mechanism 1100 includes one or more buttons 1154 or alternatives (e.g., toggles, posts, or the like) attached with the attachment portion, and positioned to retain one or more loops 1156 which is attached with the platform portion 114. The positions of the buttons 1154 and loops 1156 may vary, or may be reversed. The loops 1156 may be elastic or non-elastic, and can include any suitably flexible material (e.g., string, elastic band, textile, etc.).

Figure 12:
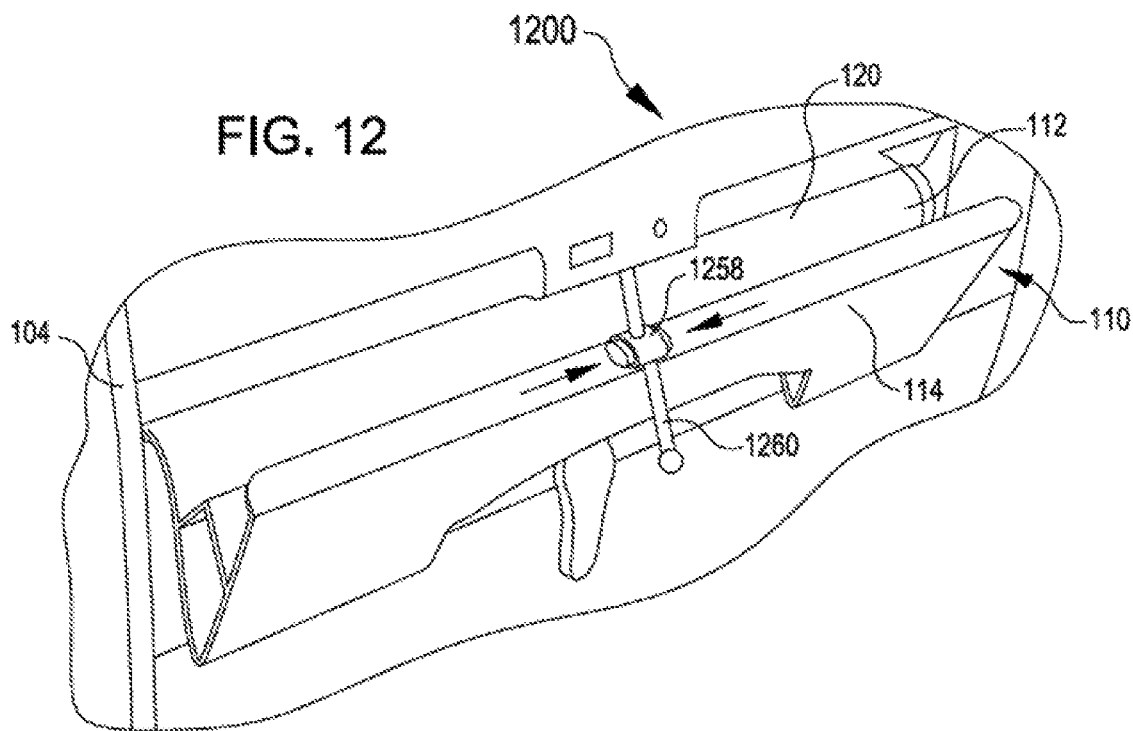
FIG. 12 is a perspective view of a passenger seating arrangement and attached modular folding shelf, showing a first example of a band and pushbutton release mechanism.

FIG. 12 is a perspective view of a passenger seating arrangement having a passenger seat back 104 and an attached modular folding shelf 110, showing a first example of a band and pushbutton release mechanism 1200. In the band and pushbutton release mechanism 1200, a band 1260 extends from the seat back 104 or from the attachment portion 112 of the modular folding shelf 110 and passes through a pushbutton assembly 1258 attached with the platform portion 114. The pushbutton assembly 1258 can include an internal spring that grips the band 1260, but releases the band when the pushbutton assembly is squeezed by a passenger. The modular folding shelf 110 can be deployed when a passenger squeezes the pushbutton assembly 1250 and pulls outward or down on the platform portion 114, and stowed when the passenger pushes the platform portion closed while holding the band 1260.

Figure 13A:
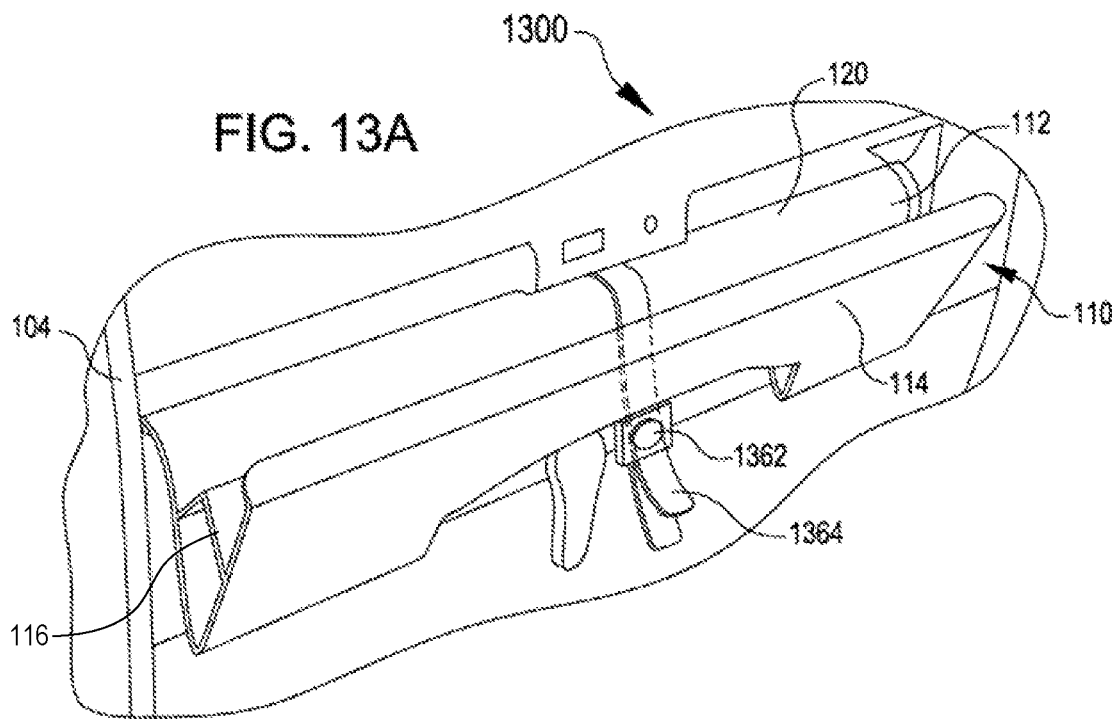
FIG. 13A is a perspective view of a passenger seating arrangement and attached modular folding shelf, showing a second example of a band and pushbutton release mechanism.
Figure 13B:
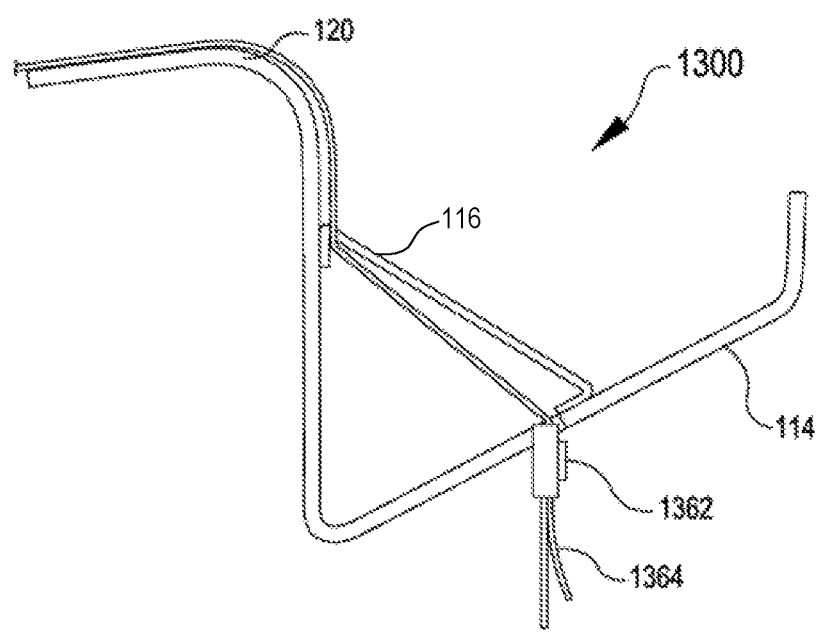
FIG. 13B is a side view of the passenger seating arrangement and attached modular folding shelf of FIG. 13A.

FIG. 13A is a perspective view of a passenger seating arrangement having a passenger seat back 104 and an attached modular folding shelf 110, showing a second example of a band and pushbutton release mechanism 1300. In this second example, a band 1364 extends through and below the support element 116, to emerge from a second pushbutton assembly 1362 attached with the platform portion 114 also below the support element 116. This positioning of elements avoids obstructing the usable portion of the platform portion 114 and support element 116 when the modular folding shelf 110 is deployed, as shown in a side view in FIG. 13B.

FIG. 14 is a process flow chart illustrating a process 1400 of retrofitting a passenger seat to receive a modular folding shelf as illustrated in any of FIGS. 1-13B. In accordance with various embodiments, the modular folding shelves described herein may be configured to match the dimensions of existing passenger seats (e.g., the attachment portion 112 having a footprint shaped and sized to match preexisting features of passenger seats), but in some embodiments, installation of a modular folding shelf to a passenger seat may first include replacing a passenger seat back shroud or shell with one having a portion sized to match or otherwise prepared for mounting the modular folding shelf. (Act 1402) If the seat back shroud or shell is so replaced, it may include attachment features or attachment points already suited for receiving attachment elements of the modular folding shelf. Otherwise, one or more attachment features (e.g., a touch fastener tape or panel, an adhesive, a socket for a bolt, screw, or snap fit, or other suitable attachment feature) can be fixed to the seat back. (Act 1404) The modular folding shelf can then be placed against the seat back and secured via the one or more attachment features and any suitable securement elements (e.g., connectors such as bolts, screws, rivets) or by way of an adhesive, touch fastener, or mechanical interference between a feature of the modular folding shelf and the seat back. (Act 1406) The modular folding shelf can then be secured in a stowed configuration (Act 1408), from which it can be deployed (Act 1410). According to various embodiments, the modular folding shelf is removable, and can be separated from the passenger seat back either by optionally removing one or more connectors between the modular folding shelf and the passenger seat back (Act 1412), and/or by pulling the attachment portion from the seat back to release a touch fastener, snap, or adhesive connecting the modular folding shelf thereto (Act 1014).

The process 1400 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of process 1400 may be performed manually.

In the following, further examples are described to facilitate the understanding of the invention:

Example A: A modular folding shelf, comprising: an attachment portion configured to removably connect with a passenger seat back; a platform portion connected with the attachment portion by a hinge at a lower extent of the modular folding shelf that allows the platform portion to fold toward and rest proximate to the attachment portion when the modular folding shelf is installed and in a stowed configuration, and to extend away from the passenger seat back in a deployed configuration; and a folding support element connected between the attachment portion and the platform portion and configured to fold between the attachment portion and the platform portion when the platform portion is stowed, and to extend when the platform portion is deployed such that the folding support element prevents the platform portion from extending beyond the deployed configuration.

Example B: The modular folding shelf of example A, wherein the attachment portion comprises an extension configured to mate with the passenger seat back.

Example C: The modular folding shelf of any one of the preceding examples, wherein the platform portion comprises a flat supportive surface and a flanged lip configured to retain a passenger item.

Example D: The modular folding shelf of any one of the preceding examples, wherein the platform portion is inclined toward the passenger seat back such that, when the modular folding shelf is installed in the passenger seat and the platform portion is deployed receiving a personal electronic device, an inclination of the platform portion is sufficiently large to retain the personal electronic device when the passenger seat back is reclined.

Example E: The modular folding shelf of any one of the preceding examples, wherein an inclination of the platform portion, when the modular folding shelf is installed in the passenger seat and the platform portion is deployed, is at least 30 degrees from horizontal.

Example F: The modular folding shelf any one of the preceding examples, wherein the platform portion is positioned such that, when the modular folding shelf is installed in the passenger seat and the platform portion is deployed receiving a personal electronic device, the personal electronic device is retained in a viewing orientation by the platform portion and by the passenger seat.

Example G: The modular folding shelf of any one of the preceding examples, wherein the folding support element comprises a plurality of living hinges separating support segments formed between the attachment portion and the platform portion and separated from the hinge by a nonzero distance.

Example H: The modular folding shelf of any one of the preceding examples, wherein the attachment portion, the platform portion, and the folding support element are integrally formed as a single part configured to bend at the hinge and along the folding support element.

Example I: The modular folding shelf of example H, wherein the attachment portion, the platform portion, and the folding support element are formed of a contiguous molded polymer part.

Example J: The modular folding shelf of any one of the preceding examples, wherein the folding support element comprises a flexible leather or textile band connected to the attachment portion and the platform portion.

Example K: The modular folding shelf of any one of the preceding examples, wherein the attachment portion and the platform portion are a contiguous thermoformed polymer part that narrows at the hinge.

Example L: The modular folding shelf of example K, further comprising a retention element connected with the platform portion and configured to retain the platform portion with respect to the attachment portion when the modular folding shelf is stowed.

Example M: The modular folding shelf of any one of the preceding examples, wherein the retention element comprises one of a magnet, or pressure snap, hook-and-loop or other touch fastener, a pull tab, an interference stopper, an elastic band or loop, or a manually retractable ribbon with a retainer.

Example N: The modular folding shelf of any one of the preceding examples, wherein the attachment portion comprises a touch fastener configured to removably connect the modular folding shelf with the passenger seat back.

Example O: The modular folding shelf of any one of the preceding examples, wherein the attachment portion comprises a mechanical fastener configured to removably mate with the passenger seat back.

Example P: A passenger seat, comprising: a seat back configured to support a back of a passenger; and a modular folding shelf removably connected with the seat back, the modular folding shelf comprising: an attachment portion removably connected with the seat back; a platform portion connected with the attachment portion by a hinge at a lower extent of the modular folding shelf that allows the platform portion to fold toward and rest proximate the passenger seat back when the modular folding shelf is stowed, and to extend away from the seat back when the modular folding shelf is deployed; and a folding support element connected between the attachment portion and the platform portion and configured to fold between the attachment portion and the platform portion when the platform portion is stowed, and to extend when the platform portion is deployed such that the folding support element supports the platform portion.

Example Q: The passenger seat of Example P, wherein the platform portion comprises a first retention element and the passenger seat comprises a second retention configured to mate with the first retention element in order to retain the modular folding shelf when the modular folding shelf is stowed.

Example R: A method of installing a modular folding shelf to a passenger seat, the method comprising: with a modular folding shelf comprising: an attachment portion comprising an attachment feature; a platform portion connected with the attachment portion by a hinge at a lower extent of the modular folding shelf that allows the platform portion to fold toward and rest proximate the attachment portion when the modular folding shelf is stowed and to extend away from the attachment portion when the modular folding shelf is deployed; and a folding support element connected between the attachment portion and the platform portion and configured to fold between the attachment portion and the platform portion when the platform portion is stowed, and to extend when the platform portion is deployed such that the folding support element supports the platform portion, attaching the modular folding shelf to a seat back of a passenger seat positioned such that, when the modular folding shelf is deployed, the platform portion and the seat back are arranged to support a personal electronic device, and when the modular folding shelf is stowed, a retention element retains the modular folding shelf in the stowed configuration.

Example S: The method of Example R, wherein attaching the modular folding shelf comprises removably connecting the attachment portion to the seat back by one of a touch fastener, adhesive, snap, or mechanical connector.

Example T: The method of one of any one of the preceding examples, wherein the attachment portion of the modular folding shelf further comprises an extension configured to mate with the seat back, and wherein attaching the modular folding shelf to the seat back comprises inserting the extension into the seat back to support the modular folding shelf.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A modular folding shelf, comprising:
an attachment portion configured to removably connect with a passenger seat back;
a platform portion connected with the attachment portion by a hinge at a lower extent of the modular folding shelf that allows the platform portion to fold toward and rest proximate to the attachment portion when the modular folding shelf is installed and in a stowed configuration, and to extend away from the passenger seat back in a deployed configuration; and
a folding support element connected between the attachment portion and the platform portion and configured to fold between the attachment portion and the platform portion when the platform portion is stowed, and to extend when the platform portion is deployed such that the folding support element prevents the platform portion from extending beyond the deployed configuration, wherein the attachment portion, the platform portion, and the folding support element are integrally formed as a single part configured to bend at the hinge and along the folding support element, wherein the attachment portion, the platform portion, and the folding support element are formed of a contiguous molded polymer part, wherein the folding support element comprises a central hinge line that extends substantially an entire width of attachment portion and the platform portion such that the folding support element folds in an accordion-like manner between a first configuration in which the folding support element is substantially planar between the attachment portion and the platform portion and a second configuration in which the folding support element is folded upward to be captured between the attachment portion and the platform portion.

2. The modular folding shelf of claim 1, wherein the attachment portion comprises an extension configured to mate with the passenger seat back.

3. The modular folding shelf of claim 2, wherein the platform portion comprises a flat supportive surface and a flanged lip configured to retain a passenger item.

4. The modular folding shelf of claim 1, wherein the platform portion is inclined toward the passenger seat back such that, when the modular folding shelf is installed in the passenger seat and the platform portion is deployed receiving a personal electronic device, an inclination of the platform portion is sufficiently large to retain the personal electronic device when the passenger seat back is reclined.

5. The modular folding shelf of claim 1, wherein an inclination of the platform portion, when the modular folding shelf is installed in the passenger seat and the platform portion is deployed, is at least 30 degrees from horizontal.

6. The modular folding shelf of claim 1, wherein the platform portion is positioned such that, when the modular folding shelf is installed in the passenger seat and the platform portion is deployed receiving a personal electronic device, the personal electronic device is retained in a viewing orientation by the platform portion and by the passenger seat.

7. The modular folding shelf of claim 1, wherein the folding support element comprises a plurality of living hinges separating support segments formed between the attachment portion and the platform portion and separated from the hinge by a nonzero distance.

8. The modular folding shelf of claim 1, wherein the attachment portion and the platform portion are a contiguous thermoformed polymer part that narrows at the hinge.

9. The modular folding shelf of claim 1, further comprising a retention element connected with the platform portion and configured to retain the platform portion with respect to the attachment portion when the modular folding shelf is stowed.

10. The modular folding shelf of claim 1, wherein the attachment portion comprises a touch fastener configured to removably connect the modular folding shelf with the passenger seat back.

11. The modular folding shelf of claim 1, wherein the attachment portion comprises a mechanical fastener configured to removably mate with the passenger seat back.

12. A passenger seat, comprising:
a seat back configured to support a back of a passenger; and
a modular folding shelf removably connected with the seat back, the modular folding shelf comprising:
an attachment portion removably connected with the seat back;
a platform portion connected with the attachment portion by a hinge at a lower extent of the modular folding shelf that allows the platform portion to fold toward and rest proximate the passenger seat back when the modular folding shelf is stowed, and to extend away from the seat back when the modular folding shelf is deployed; and
a folding support element connected between the attachment portion and the platform portion and configured to fold between the attachment portion and the platform portion when the platform portion is stowed, and to extend when the platform portion is deployed such that the folding support element supports the platform portion, wherein the attachment portion, the platform portion, and the folding support element are integrally formed as a single part configured to bend at the hinge and along the folding support element, wherein the attachment portion, the platform portion, and the folding support element are formed of a contiguous molded polymer part, wherein the folding support element comprises a central hinge line that extends substantially an entire width of attachment portion and the platform portion such that the folding support element folds in an accordion-like manner between a first configuration in which the folding support element is substantially planar between the attachment portion and the platform portion and a second configuration in which the folding support element is folded upward to be captured between the attachment portion and the platform portion.

13. The passenger seat of claim 12, wherein the platform portion comprises a first retention element and the passenger seat comprises a second retention configured to mate with the first retention element in order to retain the modular folding shelf when the modular folding shelf is stowed.

14. A method of installing a modular folding shelf to a passenger seat, the method comprising:
with a modular folding shelf comprising:
an attachment portion comprising an attachment feature;
a platform portion connected with the attachment portion by a hinge at a lower extent of the modular folding shelf that allows the platform portion to fold toward and rest proximate the attachment portion when the modular folding shelf is stowed and to extend away from the attachment portion when the modular folding shelf is deployed; and
a folding support element connected between the attachment portion and the platform portion and configured to fold between the attachment portion and the platform portion when the platform portion is stowed, and to extend when the platform portion is deployed such that the folding support element supports the platform portion, wherein the attachment portion, the platform portion, and the folding support element are integrally formed as a single part configured to bend at the hinge and along the folding support element, wherein the attachment portion, the platform portion, and the folding support element are formed of a contiguous molded polymer part, wherein the folding support element comprises a central hinge line that extends substantially an entire width of attachment portion and the platform portion such that the folding support element folds in an accordion-like manner between a first configuration in which the folding support element is substantially planar between the attachment portion and the platform portion and a second configuration in which the folding support element is folded upward to be captured between the attachment portion and the platform portion, attaching the modular folding shelf to a seat back of a passenger seat positioned such that, when the modular folding shelf is deployed, the platform portion and the seat back are arranged to support a personal electronic device, and when the modular folding shelf is stowed, a retention element retains the modular folding shelf in a stowed configuration.

15. The method of claim 14, wherein attaching the modular folding shelf comprises removably connecting the attachment portion to the seat back by one of a touch fastener, adhesive, snap, or mechanical connector.

16. The method of claim 14, wherein the attachment portion of the modular folding shelf further comprises an extension configured to mate with the seat back, and wherein attaching the modular folding shelf to the seat back comprises inserting the extension into the seat back to support the modular folding shelf.

17. The modular folding shelf of claim 1, further comprising a retention element connected with the platform portion so as to be positioned underneath the folding support element and configured to retain the platform portion with respect to the attachment portion when the modular folding shelf is stowed.

* * * * *